US009736001B2

(12) United States Patent
Matthe et al.

(10) Patent No.: US 9,736,001 B2
(45) Date of Patent: Aug. 15, 2017

(54) ORTHOGONAL MULTICARRIER TRANSMISSION SYSTEM USING CONJUGATE-ROOT OFFSET-QAM

(71) Applicant: Vodafone GmbH, Dusseldorf (DE)

(72) Inventors: Maximilian Matthe, Dresden (DE);
Gerhard Fettweis, Dresden (DE); Ivan Gaspar, Dresden (DE)

(73) Assignee: Vodafone GmbH, Dusseldorf (DE)

( * ) Notice: Subject to any disclaimer, the term of this patent is extended or adjusted under 35 U.S.C. 154(b) by 0 days.

(21) Appl. No.: 14/961,388

(22) Filed: Dec. 7, 2015

(65) Prior Publication Data

US 2016/0164712 A1    Jun. 9, 2016

(30) Foreign Application Priority Data

Dec. 8, 2014    (EP) .................................... 14196836

(51) Int. Cl.
| | | |
|---|---|---|
| H04K 1/10 | (2006.01) | |
| H04L 27/28 | (2006.01) | |
| H04L 27/34 | (2006.01) | |
| H04L 5/00 | (2006.01) | |
| H04L 25/03 | (2006.01) | |
| H04L 27/26 | (2006.01) | |

(52) U.S. Cl.
CPC ........ H04L 27/3494 (2013.01); H04L 5/0007 (2013.01); H04L 25/0384 (2013.01); H04L 27/2698 (2013.01); *H04L 27/264* (2013.01)

(58) Field of Classification Search
CPC ............... H04L 27/3494; H04L 5/0007; H04L 25/0384; H04L 27/264; H04L 27/2698; H04L 1/0668

USPC ................................ 375/260, 261, 298, 346
See application file for complete search history.

(56) References Cited

U.S. PATENT DOCUMENTS

2014/0348252 A1* 11/2014 Siohan ................. H04L 1/0668
375/261

FOREIGN PATENT DOCUMENTS

| IT | EP656705 A2 * | 6/1995 |
|---|---|---|
| WO | 2013/152249 | 10/2013 |

OTHER PUBLICATIONS

European Search Report for EP 14 19 6836 dated May 20, 2015.
Chen H-H et al: "Optimization of Transmitter and Receiver Filters for OQAM-OFDM Systems Using Nonlinear Programming", IEICE Transactions on Communications, Communications Society, Tokyo, JP, vol. E80-B, No. 11, Nov. 1, 1997(Nov. 1, 1997), pp. 1680-1687, XP000733753, ISSN: 0916-516 Section 2; figure 1.
Beaulieu N C et al: "Transmission Properties of Conjugate-Root Pulses", IEEE Transactions on Communications, IEEE Service Center, Piscataway, NJ. USA, vol. 52, No. 4, Apr. 1, 2004 (Apr. 1, 2004), pp. 553-558, XP011111850, ISSN: 0090-6778, DOI: 10.1109/TCOMM.2004.826412 Sections I-II; figure 1.

(Continued)

*Primary Examiner* — Phuong Phu
(74) *Attorney, Agent, or Firm* — Workman Nydegger

(57) ABSTRACT

In an orthogonal multicarrier radio transmission system complex-valued symbols are transmitted, wherein the real part and the imaginary part of each symbol are shifted against each other by one half symbol period and wherein a non-symmetric conjugate-root filter is applied to each symbol before transmission to mitigate inter-carrier interference and intersymbol interference. Corresponding reverse steps are performed at the receiver.

6 Claims, 4 Drawing Sheets

(56) References Cited

OTHER PUBLICATIONS

Matthe Maximilian et al: "Influence of pulse shaping on bit error rate performance and out of band radiation of Generalized Frequency Division Multiplexing", 2014 IEEE International Conference on Communications Workshops (ICC), IEEE, Jun. 10, 2014 (Jun. 10, 2014), pp. 43-48, XP032630872, DOI: 10.1109/ICCW.2014.6881170 [retrieved on Aug. 20, 2014] Section II; figure 1.

Michailow Nicola et al: "Generalized Frequency Division Multiplexing for $5^{th}$ Generation Cellular Networks", IEEE Transactions on Communications, IEEE Service Center, Piscataway, NJ. USA, vol. 62, No. 9, Sep. 1, 2014 (Sep. 1, 2014), pp. 3045-3061, XP011559563, ISSN: 0090-6778, DOI: 10.1109/TCOMM.2014.2345566 [retrieved on Sep. 19, 2014] Sections II-]II; figures 1-2.

Tanee Demeechai: "Pulse-Shaping Filters with ISI-Free Matched and Unmatched Filter Properties", IEEE Transactions on Communications, IEEE Service Center, Piscataway, NJ. USA, vol. 46, No. 8, Aug. 1, 1998 (Aug. 1, 1998), XP011009224, ISSN: 0090-6778 Section II.

\* cited by examiner

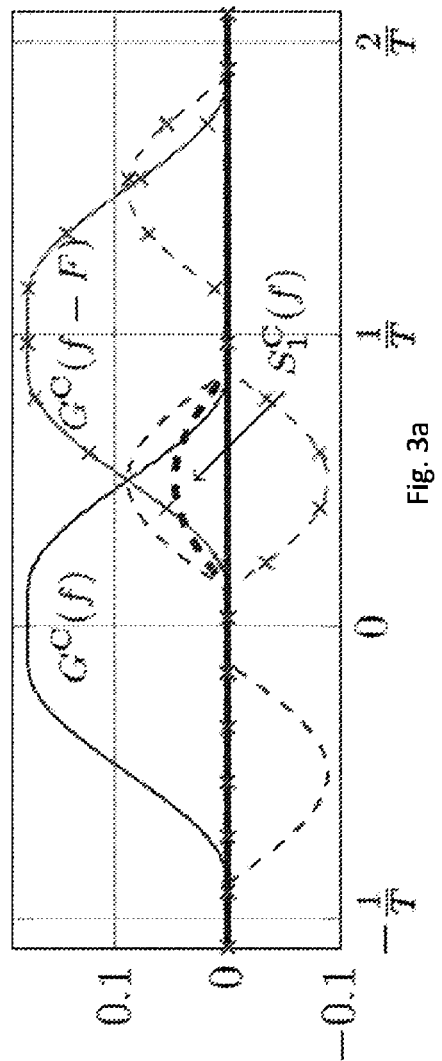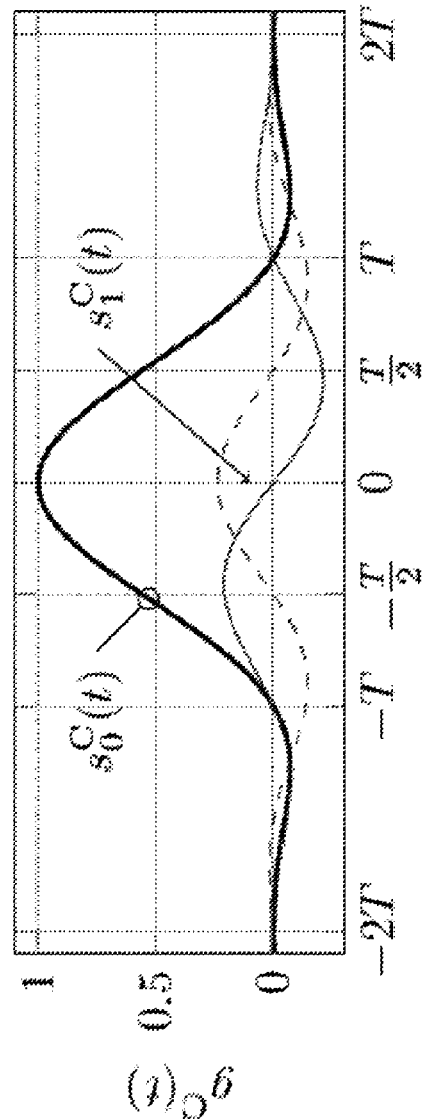

ORTHOGONAL MULTICARRIER TRANSMISSION SYSTEM USING CONJUGATE-ROOT OFFSET-QAM

CROSS-REFERENCE TO RELATED APPLICATIONS

This application claims the benefit of and priority from European Patent Application No: 14196836.2, filed Dec. 8, 2014, the entire disclosure of which is expressly incorporated by reference herein in its entirety.

BACKGROUND

1. The Field of the Invention

The invention relates to an orthogonal multicarrier transmission system and corresponding method applying a pulse shaping filter to mitigate intercarrier and intersymbol interference. In particular the invention relates to an orthogonal multicarrier transmission system using an Offset-QAM modulation and applying a non-symmetric conjugate-root (CR) filter for pulse shaping, which will be referred to by the term Conjugate-Root OQAM (CR-OQAM).

2. The Relevant Technology

Current 4G LTE-(Advanced) systems are based on OFDM that provides intersymbol interference (ISI)-free and intercarrier interference (ICI)-free transmissions in ideal AWGN channels, i.e. in channels where only white Gaussian noise is added to a transmit signal. However, if the channel is time-frequency dispersive such as a real channel of a cellular communication system, good time-frequency localization of the transmit signal is required to cope with asynchronicities. Furthermore, low out-of-band radiation is required to enhance spectral agility and aggregation of carriers.

One way to mitigate interference in transmissions is to use so-called Offset-QAM (OQAM) instead of conventional QAM modulation in a multicarrier system, for example OFDM/OQAM. In Offset-QAM modulation complex valued data symbols $c_{k,m}$ are transmitted on $1 \ldots k \ldots K-1$ subcarriers, where the real and imaginary portion of a symbol are offset by half a symbol duration T, i.e. by ½T. To mitigate ISI and ICI, each symbol is pulse-shaped with a symmetric, real-valued half-Nyquist pulse shaping filter which is band-limited to two subcarriers.

While this approach does not achieve complex orthogonality, it provides quasi-orthogonality in the real domain. With regard to the symbol rate, these systems allow doubling of the symbol rate, but only real-valued symbols are transmitted. Hence these systems provide the same effective data rate as conventional OFDM/QAM systems. However, well localized transmit and receive filters can still be used to cope with misalignments in time and frequency.

The application of conventional Offset-QAM in multicarrier systems requires the use of pulse shaping filters, wherein these have to be symmetric in both the time and the frequency domain and furthermore have to be half-Nyquist filters. Furthermore, in conventional Offset-QAM systems, a phase shift of ½π is required between subcarriers and subsequent symbols, i.e. adjacent sub-carriers are shifted in phase by ½π against each other. As a consequence the phase space of conventional multicarrier systems using Offset-QAM is varying in both time and frequency and thus increases the complexity of an implementation in a transmitter and corresponding receiver.

Hence there is a need to provide an improved Offset-QAM system that at least mitigates some of the above mentioned problems.

BRIEF SUMMARY OF THE INVENTION

A multicarrier radio transmitter (110) for transmitting complex-valued QAM symbols is described, wherein the transmitter comprises
- at least delay block (1130 ... 113K−1) for delaying one of the real part or the imaginary part of each respective symbol by half a symbol time thus producing Offset-QAM symbols, and
- at least one non-symmetric conjugate-root filter (1150 ... 115K−1) for pulse-shaping each Offset-QAM symbol thus producing conjugate-root filtered offset-QAM symbols, and
- at least one up-converter (1160 ... 116K−1) for converting the conjugate-root filtered Offset-QAM symbols to respective carrier frequencies, and
- a demultiplexer (117) for producing a vector of upconverted conjugate-root filtered Offset-QAM symbols based on a plurality of upconverted conjugate-root filtered symbols, and
- a radio front-end block to radiate a signal representing the vector of upconverted conjugate-root filtered Offset-QAM symbols.

Furthermore a corresponding radio receiver is described.

BRIEF DESCRIPTION OF THE DRAWINGS

The improved multicarrier transmission system using Offset-QAM is described in the following with reference to the accompanying figures, wherein FIGS. 3a, 3b depict the inter-channel interference of non-symmetric conjugate-root filter in frequency and in the time domain

DETAILED DESCRIPTION

The embodiments as described below relate to a transmitter and corresponding receiver for transmitting and receiving radio signals according to the below described functions. Though the transmitter may be used in any arbitrary radio transmitter and corresponding arbitrary receiver, the functional blocks can be implemented in a transmitter of a cellular communication system. Likewise below described functional blocks of the receiver may be implemented in a receiver of a cellular communication system. Thus a transmitter and a receiver may be implemented in a base station or in a mobile terminal of the cellular communication system.

Figure 1:
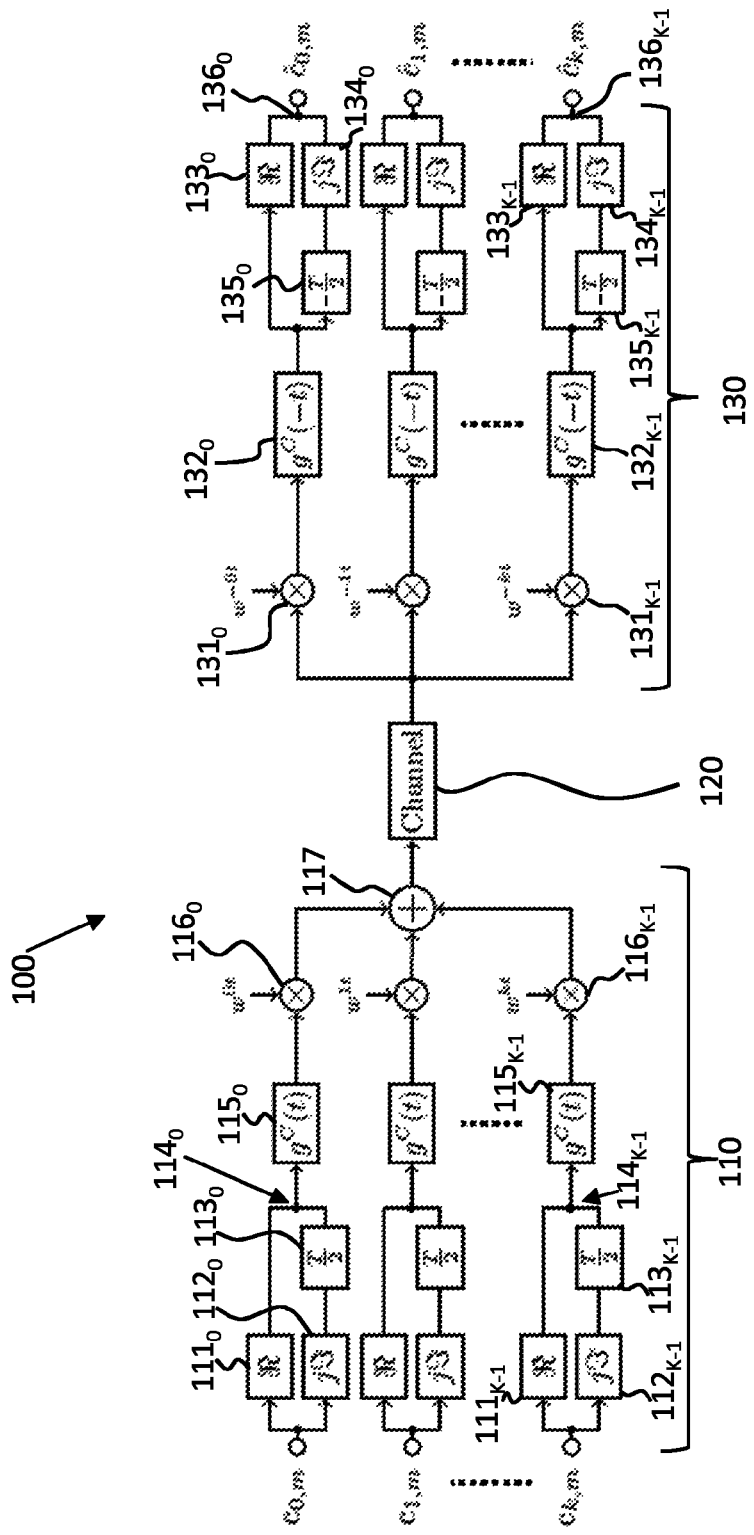
FIG. 1 depicts a block diagram of an improved Offset-QAM system.

FIG. 1 depicts a conjugate-root Offset-Quadrature Amplitude Modulation (QAM) multicarrier system 100, wherein a transmitter 110 transmits digital information via channel 120 to a receiver 130. Though system 100 is depicted as a block diagram in order to illustrate the invention, wherein the transmitter and receiver comprise functional blocks arranged in a plurality of parallel processing paths, the functional blocks may be implemented in software executed on a digital signal processor. In other words dividing of functions into processing blocks and the arranging in processing paths shall illustrate the invention but shall not limit the invention to any physical implementation, i.e. the invention shall not be limited to any particular arrangement in hard- and/or software.

Further note that transmitter 110 may comprise functional blocks that are not shown in FIG. 1. These blocks may be provided for source encoding and/or mapping digital information, i.e. bits, to complex-valued symbols or scrambling of bits or associating bits to symbols as known from conventional transmitters and processing blocks for performing Fourier- and inverse Fourier transformations. Furthermore transmitter 110 may comprise a digital-to-analog processing block, an analog power amplifier for amplifying the signal before radiation etc.

Similarly the receiver may comprise functional blocks that are not shown in the figure. Those functional blocks may comprise a low-noise amplifier for amplifying a received analog signal, an analog-to-digital converter for converting the received signal into the digital domain, one or more processing blocks for performing Fourier- or inverse Fourier-transformations and other operations. Hence, detail descriptions of these processing blocks in the transmitter and receiver are omitted here in order to not obscure the description.

Transmitter 110 receives complex-valued data symbols $c_{0,m} \ldots c_{k,m} \ldots c_{K-1,m}$ that have been assigned to a plurality of K orthogonal carriers indexed as $0 \ldots k \ldots K-1$ by a demultiplexer that is not shown in the figure. For illustration purposes transmitter 110 provides a corresponding plurality of K processing paths for processing the data symbols. The symbols are QAM modulated, i.e. each symbol comprises a real part and an imaginary part. Note that in alternative embodiments other modulations, e.g. QPSK modulations, can be deployed.

As illustrated in the figure each complex-valued symbol is split into its real part and its imaginary part, i.e. respective blocks $111_0 \ldots 111_{K-1}$ forward the real part of a symbol only while blocking the imaginary part while respective blocks $112_0 \ldots 112_{K-1}$ forward the imaginary part of a symbol by blocking the real part. Then processing blocks $113_0 \ldots 113_{K-1}$ delay the imaginary part of each symbol by half a symbol period, i.e. by ½T wherein T is the symbol duration. Note that delaying the imaginary part by ½ T is equal to delaying the real part by ½T.

The real part and the imaginary part of each symbol are then merged for each carrier, here depicted for each path, at $114_0 \ldots 114_{K-1}$. Hence the real part and the imaginary part of each complex-valued symbol are shifted in time against each other by ½T.

Each symbol is then filtered by a pulse shaping filter $115_0 \ldots 115_{K-1}$ wherein the filter is a conjugate-root filter. Note that conventional OQAM systems used symmetric pulses to achieve orthogonality, i.e. based on G(f) containing real valued coefficients.

The embodiments according to the invention use non-symmetric half-Nyquist filters, so called conjugate-root filters, wherein the coefficients of the filters become complex according to $$G^c(f) = \begin{cases} H(f) + j\sqrt{(1-H(f))H(f)} & f \geq 0 \\ H(f) - j\sqrt{(1-H(f))H(f)} & f < 0 \end{cases}$$

wherein H (f) is the transfer function of a Nyquist filter that is band-limited to two subcarriers. The impulse response of the conjugate-root filter is given by $$g^C(t) = \mathcal{F}^{-1}\{G^C(f)\}$$

wherein $\mathcal{F}^{-1}$ denotes an inverse Fourier transformation.

In one embodiment the Nyquist filter H (f) can be a raised cosine filter (RC) with any rolloff, particularly when applying matched-filter symbol detection at the receiver, though the invention shall not be limited in this regard. In alternative embodiments, H(f) may be a raised ramp. Furthermore, other smoothing functions, e.g. the Meyer wavelet auxiliary function, $v(f) = f^4(35-84f+70f^2-20f^3)$, can be directly employed or can be used in combination with other functions, e.g. as an argument of the raised cosine function, $(\cos(2\pi v(f))+1)/2$.

Figure 2A:
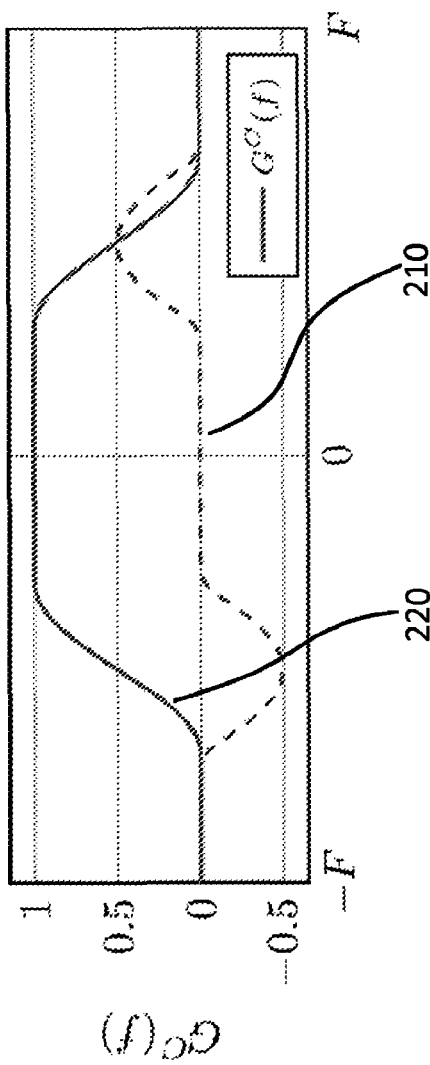
FIGS. 2a, 2b depict a frequency response of a conjugate root-raised cosine filter and a impulse response of a conjugate root-raised cosine filter.

FIG. 2a depicts the frequency response of conjugate root raised cosine filter wherein the solid line 210 represents the real part and the dashed line 220 represents the imaginary part. As illustrated in FIG. 2a the imaginary part of the frequency response is not even.

Figure 2B:
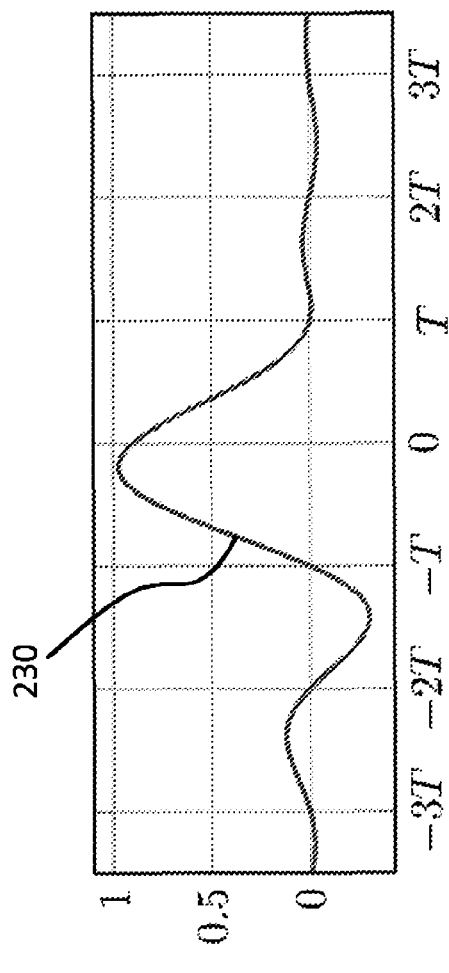

FIG. 2b depicts the pulse response of the conjugate root raised cosine filter 230 that also illustrates the non-symmetry.

As a consequence of applying the non-symmetric conjugate-root filter the inter-carrier interference (ICI) between two adjacent subcarriers when using conjugate-root filters is given by $$s_1^C(f) = G^C(f-F)[G^C(f)]^*$$

FIG. 3a depicts the ICI of non-symmetric conjugate-root filter $G^C(f)$, also confer above equation, in the frequency domain and FIG. 3b illustrates the ICI in the time domain.

Assuming now that $g^C(t)$ fulfills the conditions for orthogonality, then the orthogonality conditions for the k-th subcarrier and the m-th time slot are $$\Re\{(g^C(t)w^{-kt} * g^C(-t))|_{t=mT}\} = \delta(k,m)$$

$$\Re\{(jg^C(t)w^{-kt} * g^C(-t))|_{t=(\frac{1}{2}+m)T}\} = 0$$

$$\Im\{(g^C(t)w^{-kt} * g^C(-t))|_{t=(\frac{1}{2}+m)T}\} = 0$$

$$\Im\{(jg^C(t)w^{-kt} * g^C(-t))|_{t=mT}\} = \delta(k,m)$$

An OFDM/OQAM system that uses above described non-symmetric conjugate-root filter $g^C(t)$ and as illustrated in FIG. 1 can be described by its modulation equation $$x(t) = \sum_{\substack{k=0 \\ m \in z}}^{K-1} \left( c_{k,m}^R g^C(t-mT) + jc_{k,m}^I g^C\left(t-mT-\frac{T}{2}\right) \right) w^{kt}$$

Note that the modulation equation does not comprise a multiplication by a factor $j^k$ that typically is required in modulation equations of conventional OFDM/OQAM systems. Accordingly the use of a non-symmetric conjugate-root pulse shaping filter reduces the computation load in a corresponding receiver.

The corresponding demodulation equations for the receiver are $$\hat{c}_{k,m}^R = \Re(x(t)w^{-kt} * g^C(-t))|_{t=mT}$$

$$\hat{c}_{k,m}^I = \Im(x(t)w^{-kt} * g^C(-t))|_{t=1/2+m)T}$$

wherein $\Re$ denotes an operator to extract the real part of a symbol, $\Im$ denotes an operator to extract the imaginary part of a symbol, $\hat{c}_{k,m}^{R}$ is the real part of an estimated symbol and $\hat{c}_{k,m}^{I}$ is the imaginary part of an estimated symbol.

Figure 4:
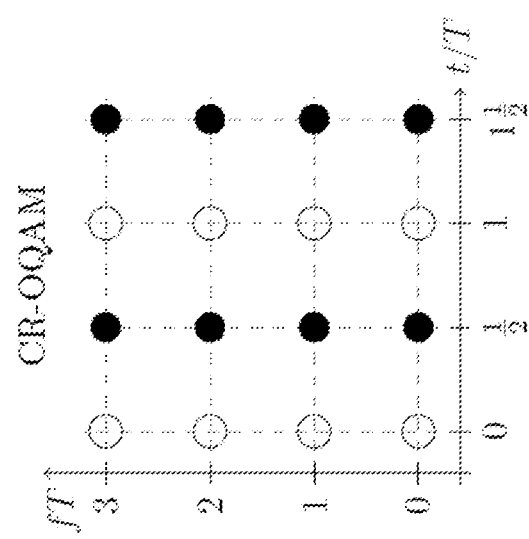
FIG. 4 depicts a phase space of the proposed conjugate-root offset-QAM.

FIG. 4 depicts the time-frequency phase space for an OFDM/CR-OQAM system using the described conjugate-root filter, wherein real values are depicted by non-filled circles and imaginary values are depicted as filled circles. Note that—when compared to conventional offset-QAM systems—the sub-carriers are not phase-shifted by ½π, hence the grid is more regular when using conjugate-root filters.

Referring now again to FIG. 1, the filtered symbols as output by the conjugate-root filters $115_0 \ldots 115_{K-1}$ are upconverted to their respective carrier frequency as illustrated by multiplications $116_0 \ldots 116_{K-1}$ with respective $\omega^{0t} \ldots \omega^{(K-1)t}$. The upconverted symbols then are summed at 117, thus producing vectors of symbols $C_m = [c_{0,m} \ldots c_{k,m} \ldots c_{K-1,m}]^T$, here in transposed notation, wherein m denotes the m-th symbol time.

In one embodiment, i.e. the system being an OFDM/CR-OQAM system, the vectors of symbols then are processed by a radio front-end that converts the vectors to analog signals and radiates the signal via an antenna.

The radiated symbols, i.e. the radiated signal travels through channel 120. Channel 120 adds noise to the signal an may furthermore distort the signal due to various channel properties, i.e. frequency selective fading and/or multipath propagation etc.

Receiver 130 receives the signal as distorted by channel 120 and to a large extend performs the reverse operations as those performed in the transmitter. When the signal has been received by at least one antenna, the received analog signal may be processed by analog functional blocks, e.g. amplified by a low-noise amplifier, before it is converted to the digital domain for further processing. Note that these processing blocks may be comprised in a radio front-end block that is not depicted in FIG. 1, and which outputs a digital representation of the received signal.

Then the received signal, i.e. the superposition of all carriers, is split into the respective subcarriers by applying a down-conversion $131_0 \ldots 131_{K-1}$ to baseband as indicated by respective multiplications $131_0 \ldots 131_K$ with $\omega^{-(K-1)t}$.

Each down-converted subcarrier signal is then convolved in blocks $132_0 \ldots 132_K$ with the time-reverse of the impulse response of the conjugate root filters as applied in the transmitter, i.e. $g^C(-t)$. Since convolving a received signal with the time-reverse impulse response is a correlation, blocks $132_0 \ldots 132_{K-1}$ output estimations of the symbols associated to the respective subcarrier as transmitted, i.e. with a shift in time of half a symbol duration ½T between real and imaginary part of a symbol.

To reverse that shift in time between real and imaginary part of a symbol, each symbol is split into its respective real and imaginary part by blocks $133_0 \ldots 133_{K-1}$ and $134_0 \ldots 134_{K-1}$, the imaginary part of a symbol is shifted forward by half a symbol time ½T as indicated in blocks $135_0 \ldots 135_{K-1}$ by a negative delay ½T, then the real and imaginary part are merged at $136_0 \ldots 136_{K-1}$ thus producing estimated symbol without offset $\hat{c}_{0,m}, \hat{c}_{1,m} \ldots \hat{c}_{K-1,m}$ of the m-th time slot. Actually, the time shift between the real part and the imaginary part of a symbol can be reversed by delaying the imaginary part again by half a symbol time and delaying the real part of a symbol by a full symbol time, so the imaginary part and the real part both are delayed in total by one full symbol time.

While above described filters have been described in the context of an OFDM/OQAM system, the above described conjugate-root filters can be applied as pulse-shaping filters in a so-called GFDM transmission system as described below.

Similar as in an OFDM transmission system, GFDM is a multicarrier transmission system, but wherein a circular convolution of symbols is applied instead of linear. Hence, a GFDM transmit signal exhibits a block structure, wherein subsequent blocks of symbols can be decoupled by a cyclic prefix (CP) to ease equalization.

GFDM is modeled in discrete base band with a sampling period of $T_s$. A GFDM transmit signal $\vec{x}$ can be described by the matrix equation $\vec{x} = A\vec{d}$, wherein the columns of matrix A contain circular time-frequency shifted versions of a prototype transmit filter g(n) with distance $KT_s$ in time and $1/KT_s$ in frequency, wherein K is the number of subcarriers, T is the symbol duration, and d contains the complex-valued data symbols to be transmitted with the block. The cyclic prefix can be appended to the block of symbols. By appending a cyclic prefix, the frequency domain equalization can be carried out at the receiver, yielding an estimate of $\hat{\vec{x}}$ of transmit vector $\vec{x}$. Then, by applying a zero-forcing (ZF) or matched filter detection (MF) in the receiver, i.e.

when zero-forcing detection $\vec{d}_{ZF} = A^{-1}\hat{\vec{x}}$, and when matched-filter detection $\vec{d}_{MF} = A^H \hat{\vec{x}}$ wherein $(\bullet)^H$ denotes the Hermitian conjugate of the matrix, the transmitted data can be recovered.

A main property of GFDM is its good time-frequency-localization of the transmit filter, which allows achieving low out-of-band radiation and robustness against asynchronicity. However, when using QAM modulation in a GFDM system, the Balian-Low theorem prohibits orthogonality completely, which impacts matched-filter performance while zero-forcing detectors introduce noise-enhancement and exist for few parameter configurations only. Hence, with perfect synchronization, the symbol-error-rate (SER) is worse than in an OFDM system.

To circumvent this problem, OQAM modulation can be applied, which provides orthogonality while at the same time maintaining the advantageous property of good time-frequency localization. As illustrated by the conjugate-root phase-space depicted in FIG. 4, a modulator for a GFDM system applying a conjugate-root offset-QAM modulation is given by $$\vec{x} = A\Re\{\vec{d}\} + jC_{K/2}(A\Im\{\vec{d}\})$$

wherein $C_u(\bullet)$ denotes a circular rotation of its argument by u elements. At the receiver, the conjugate-root offset-QAM (CR-OQAM) detection with the matched filter can be achieved by determining the real part of a symbol as $$\Re\{\vec{d}\} = \Re\{A^H \vec{x}\}$$

and the imaginary part of a symbol from a received signal can be determined by $$\Im\{\vec{d}\} = \Im\{A^H C_{-K/2}(\vec{x})\}.$$

In this way a non-symmetric conjugate-root filter can be used as a pulse-shaping filter also in a GFDM transmission system. A GFDM system as modified by applying a non-symmetric conjugate-root pulse-shaping at least provides the same performance as an OFDM/OQAM system. However, since the GFDM/OQAM system exhibits low out-of-band emissions and a block-based operation, it is more suitable for flexible use of unused frequency bands.

In any case the use of an above disclosed non-symmetric conjugate-root pulse-shaping filter for an offset-QAM modulation provides for a reduced computation complexity in the transmitter, since there is no need for an extra phase shift between subcarriers, which makes the conjugate-root offset-QAM time-frequency phase space more regular thus simplifying the implementation. Furthermore conjugate-root offset-QAM may be applied to GFDM systems to create an orthogonal system with good time-frequency localization.

The invention claimed is:

1. A multicarrier radio transmitter for transmitting complex-valued Quadrature Amplitude Modulation (QAM) symbols, the transmitter comprising:
    at least one delay block for delaying one of a real part or an imaginary part of each respective symbol by half a symbol time thus producing Offset-QAM symbols;
    at least one non-symmetric conjugate-root filter for pulse-shaping each Offset-QAM symbol, said filter being of the form $$G^c(f) = \begin{cases} H(f) + j\sqrt{(1-H(f))H(f)} & f \geq 0 \\ H(f) - j\sqrt{(1-H(f))H(f)} & f < 0 \end{cases}$$

with H (f) being the transfer function of any Nyquist filter that is band-limited to two subcarriers and wherein the subcarriers are not phase-shifted by ½π, thus producing conjugate-root filtered offset-QAM symbols, and
    at least one up-converter for converting the conjugate-root filtered Offset-QAM symbols to respective carrier frequencies;
    a demultiplexer for producing a vector of upconverted conjugate-root filtered Offset-QAM symbols based on a plurality of upconverted conjugate-root filtered symbols, and
    a radio front-end block to radiate a signal representing the vector of upconverted conjugate-root filtered Offset-QAM symbols.

2. The multicarrier radio transmitter of claim 1, wherein the Nyquist filter is a raised-cosine filter.

3. The multicarrier radio transmitter of claim 1, further comprising a processing block for applying a circular prefix to a block of symbols.

4. A multicarrier radio transmission method for transmitting complex-valued Quadrature Amplitude Modulation (QAM) symbols comprising:
    delaying one of a real part or an imaginary part of each respective symbol by half a symbol time thus producing Offset-QAM symbols;
    pulse-shaping each Offset-QAM symbol by a non-symmetric conjugate-root filter, wherein the non-symmetric conjugate-root filter is of the form $$G^c(f) = \begin{cases} H(f) + j\sqrt{(1-H(f))H(f)} & f \geq 0 \\ H(f) - j\sqrt{(1-H(f))H(f)} & f < 0 \end{cases}$$

with H (f) being the transfer function of a Nyquist filter that is bandlimited to two subcarriers and wherein subcarriers are not phase-shifted by ½π, thus producing conjugate-root filtered offset-QAM symbols,
    upconverting the conjugate-root filtered Offset-QAM symbols to respective carrier frequencies;
    producing a vector of upconverted conjugate-root filtered Offset-QAM symbols based on a plurality of upconverted conjugate-root filtered symbols; and
    radiating a signal representing the vector of upconverted conjugate-root filtered Offset-QAM symbols.

5. The multicarrier radio transmission method of claim 4, wherein the Nyquist filter is a raised-cosine filter.

6. The multicarrier radio transmission method of claim 4, further comprising the step of applying a circular prefix to a block of symbols.

* * * * *